US011873547B2

(12) United States Patent
Su et al.

(10) Patent No.: US 11,873,547 B2
(45) Date of Patent: Jan. 16, 2024

(54) FUEL SYSTEM COMPONENTS

(71) Applicant: Cummins Inc., Columbus, IN (US)

(72) Inventors: Yang Su, Hubei (CN); Xiaoli Huang, Wuhan (CN); Steven E. Ferdon, Columbus, IN (US); Ross A. Phillips, Columbus, IN (US); Manoj M. Thete, Columumbs, IN (US); Brian J. Wright, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/299,934

(22) Filed: Apr. 13, 2023

(65) Prior Publication Data

US 2023/0243025 A1 Aug. 3, 2023

Related U.S. Application Data

(63) Continuation of application No. PCT/CN2020/121228, filed on Oct. 15, 2020.

(51) Int. Cl.

*F02M 55/02* (2006.01)
*C22C 38/44* (2006.01)
*C21D 1/18* (2006.01)
*C22C 38/04* (2006.01)
*C22C 38/06* (2006.01)
*C22C 38/46* (2006.01)
(Continued)

(52) U.S. Cl.

CPC ................ *C22C 38/44* (2013.01); *C21D 1/18* (2013.01); *C22C 38/04* (2013.01); *C22C 38/06* (2013.01); *C22C 38/46* (2013.01); *C23C 8/26* (2013.01); *F02M 61/166* (2013.01)

(58) Field of Classification Search

CPC ...... C22C 38/44; F02M 61/166; C21D 6/002; C21D 6/004
USPC .......................................................... 123/468
See application file for complete search history.

(56) References Cited

U.S. PATENT DOCUMENTS 4,377,553 A 3/1983 Korenko
5,091,024 A * 2/1992 DeBold .................. C22C 38/22 148/306
5,620,805 A 4/1997 Ogawa et al.
(Continued)

FOREIGN PATENT DOCUMENTS

CN 1424422 6/2003
CN 1692224 11/2005
(Continued)

OTHER PUBLICATIONS

International Search Report and Written Opinion for International patent application No. PCTCN2020121228, dated May 21, 2022, dated May 21, 2022, 9 pgs.

*Primary Examiner* — Long T Tran
*Assistant Examiner* — James J Kim
(74) *Attorney, Agent, or Firm* — Taft, Stettinius & Hollister LLP

(57) ABSTRACT

A fuel system, comprising at least one fuel component formed of a steel alloy comprising 0.01-0.31 wt. % carbon, 0.0-0.20 wt. % silicon, 0.15-0.50 wt. % manganese, 0.0-0.015 wt. % phosphorous, 0.0-0.001 wt. % sulfur, 4.80-5.20 wt. % chromium, 4.80-6.20 wt. % nickel, 0.60-0.80 wt. % molybdenum, 0.0-0.550 wt. % vanadium, and 2.000-2.400 wt. % aluminum, wherein the at least one fuel component is configured to come in contact with fuel when fuel is ran through the fuel system.

18 Claims, 9 Drawing Sheets

(51) Int. Cl.

| | |
|---|---|
| ***C23C 8/26*** | (2006.01) |
| ***F02M 61/16*** | (2006.01) |

(56) References Cited

U.S. PATENT DOCUMENTS

| | | | | |
|---|---|---|---|---|
| 6,168,095 | B1 | 1/2001 | Seitter et al. | |
| 6,702,905 | B1 * | 3/2004 | Qiao | C22C 38/54<br>148/543 |
| 6,921,511 | B2 | 7/2005 | Bourgin et al. | |
| 10,125,734 | B2 | 11/2018 | Paulus et al. | |
| 2002/0110476 | A1 * | 8/2002 | Maziasz | C21D 6/005<br>420/34 |
| 2003/0160116 | A1 | 8/2003 | Molnar | |
| 2010/0025500 | A1 | 2/2010 | Pollard et al. | |
| 2010/0147247 | A1 | 6/2010 | Qiao et al. | |
| 2011/0162612 | A1 * | 7/2011 | Qiao | C22C 38/48<br>29/888.06 |
| 2011/0311390 | A1 * | 12/2011 | Pelsoeczy | C21D 6/005<br>420/583 |
| 2020/0005975 | A1 * | 1/2020 | Jayaraman | C22C 38/30 |

FOREIGN PATENT DOCUMENTS

| | | |
|---|---|---|
| CN | 101191425 | 6/2008 |
| CN | 102667135 | 9/2012 |
| CN | 103556069 | 2/2014 |
| DE | 10256590 | 6/2004 |
| EP | 0040901 | 12/1981 |
| EP | 0268811 | 6/1988 |
| JP | 56142843 | 11/1981 |
| JP | 1121645 | 1/1999 |
| WO | 2006018348 | 2/2006 |

* cited by examiner

FUEL SYSTEM COMPONENTS

CROSS-REFERENCE TO RELATED APPLICATIONS

The present application is a continuation of PCT Patent Application No. PCT/CN2020/121228, filed Oct. 15, 2020 which is hereby incorporated by reference.

TECHNICAL FIELD OF THE DISCLOSURE

The present disclosure relates to fuel system components formed of a steel alloy and a method of making the same.

BACKGROUND OF THE DISCLOSURE

Fuel system components made from steel are often exposed to fuel with high acidity and/or sulfates that corrode the components, and lead to various issues such as cup flow issues and sealing issues, among others. For instance, fuel with high acidity and/or sulfates that passes through an injector nozzle has been known to corrode the surface of the nozzle spray hole(s) enlarging the spray hole, and increasing the cup flow. Thus, a need exists for improved fuel system components that better resist corrosion.

SUMMARY OF THE DISCLOSURE

In one embodiment of the present disclosure, a fuel system comprising at least one fuel component formed of a steel alloy comprising 0.01-0.31 wt. % carbon, 0.0-0.20 wt. % silicon, 0.15-0.50 wt. % manganese, 0.0-0.015 wt. % phosphorous, 0.0-0.001 wt. % sulfur, 4.80-5.20 wt. % chromium, 4.80-6.20 wt. % nickel, 0.60-0.80 wt. % molybdenum, 0.0-0.550 wt. % vanadium, and 2.000-2.400 wt. % aluminum, wherein the at least one fuel component is configured to come in contact with fuel when fuel is passed through the fuel system.

In another embodiment of the present disclosure, a method of manufacturing a component of a fuel system comprising rough machining an annealed steel alloy mass comprising 0.01-0.31 wt. % carbon, 0.0-0.20 wt. % silicon, 0.15-0.50 wt. % manganese, 0.0-0.015 wt. % phosphorous, 0.0-0.001 wt. % sulfur, 4.80-5.20 wt. % chromium, 4.80-6.20 wt. % nickel, 0.60-0.80 wt. % molybdenum, 0.0-0.550 wt. % vanadium, and 2.000-2.400 wt. % aluminum to form the component, hardening a core of the component, nitriding the component after hardening the core of the component, and finish machining the component.

Advantages and features of the embodiments of this disclosure will become more apparent from the following detailed description of exemplary embodiments when viewed in conjunction with the accompanying drawings.

DETAILED DESCRIPTION OF THE DRAWINGS

Figure 1:
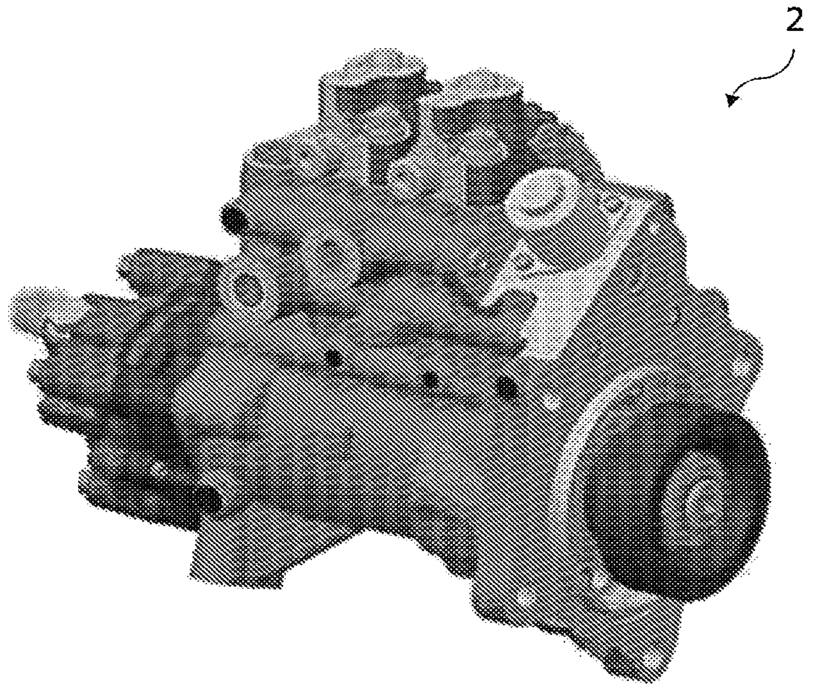
FIG. 1 shows a perspective view of a fuel pump of the present disclosure.
Figure 2:
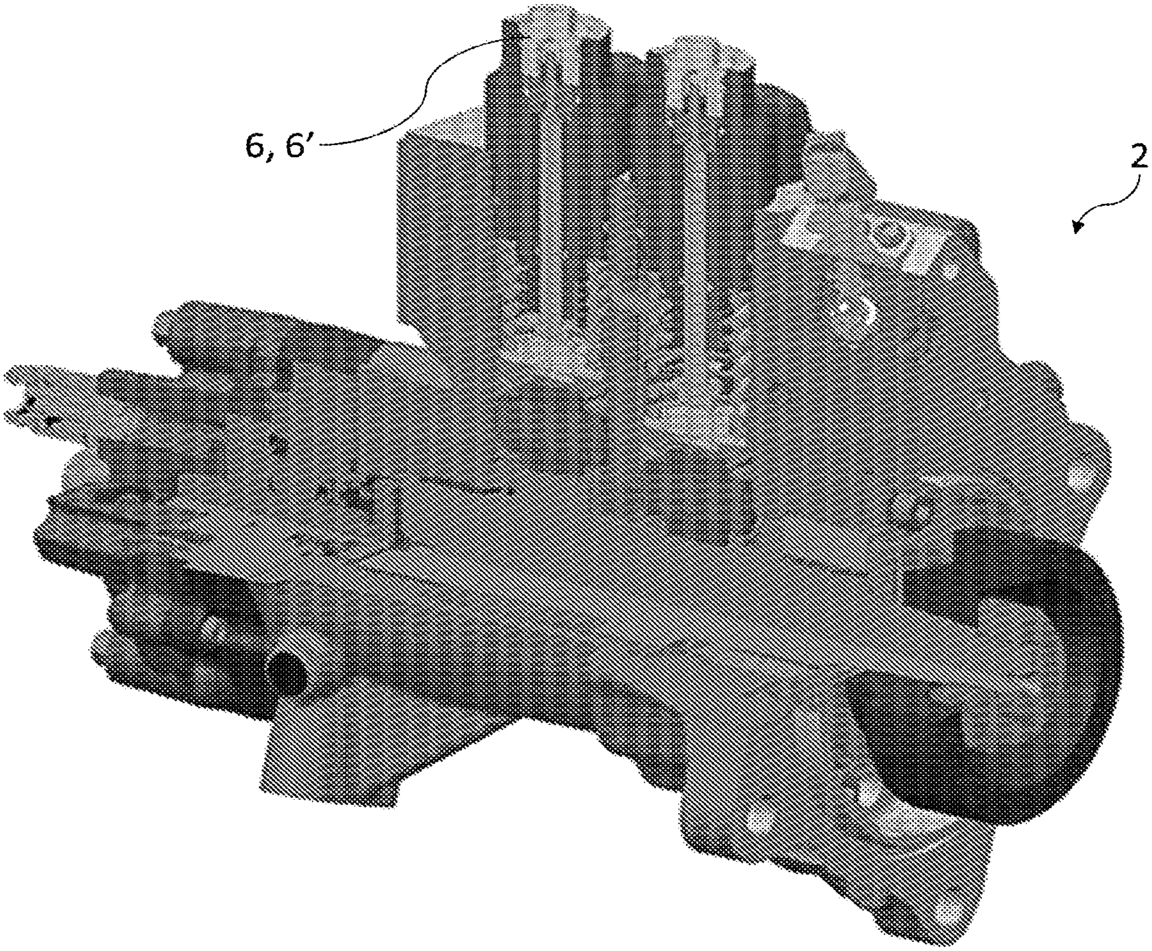
FIG. 2 shows a cut-away view of the fuel pump of FIG. 1.
Figure 3:
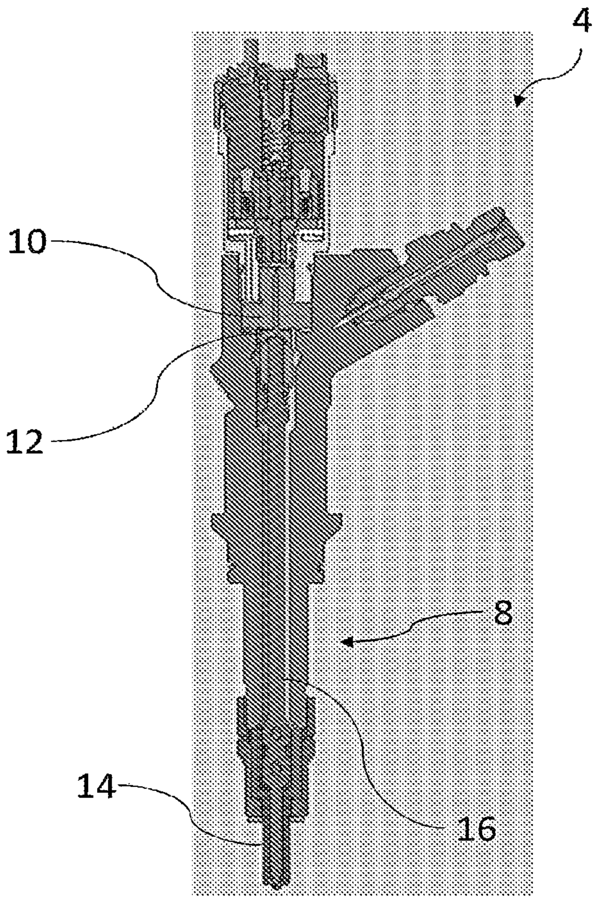
FIG. 3 shows a cross-sectional view of a portion of a fuel injector of the present disclosure.
Figure 4:
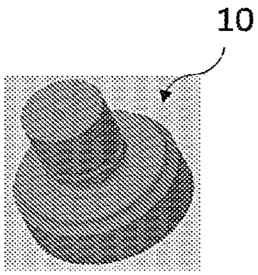
FIG. 4 shows a perspective view of an injector control valve seat of the fuel injector of FIG. 3.
Figure 5:
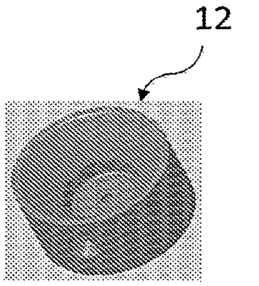
FIG. 5 shows a perspective view of an injector needle seal of the fuel injector of FIG. 3.

Referring to FIGS. 1-3, a fuel system for an internal combustion engine (not shown) includes a fuel pump 2 (FIGS. 1 and 2) and one or more fuel injectors 4 (FIG. 3). The fuel system may also include a fuel accumulator, valves, and other elements (not shown) which are fluidly coupled to fuel injector(s) 4 and/or fuel pump 2. Fuel pump 2 is configured to provide pressurized fuel to fuel injector(s) 4, and each fuel injector 4 is configured to inject metered quantities of fuel into a combustion chamber of the internal combustion engine in timed relation to the reciprocation of an engine piston (not shown).

Figure 6:
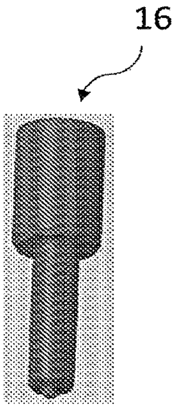
FIG. 6 shows a perspective view of an injector needle of the fuel injector of FIG. 3.
Figure 7:
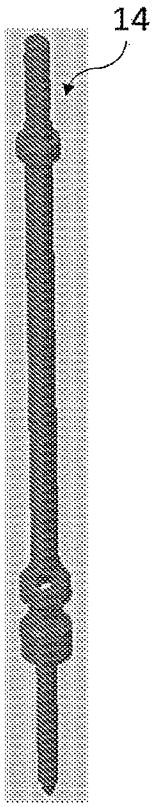
FIG. 7 shows a perspective view of an injector nozzle of the fuel injector of FIG. 3.
Figure 8A:
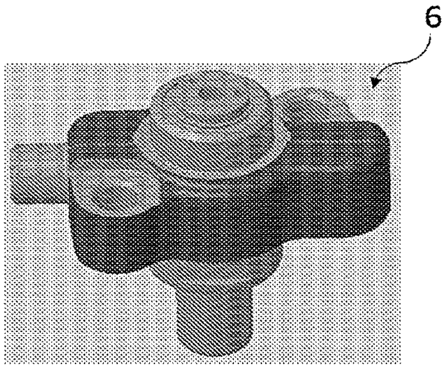
FIG. 8A shows a perspective view of a first embodiment of a pump tappet barrel of the fuel pump of FIG. 1.
Figure 8B:
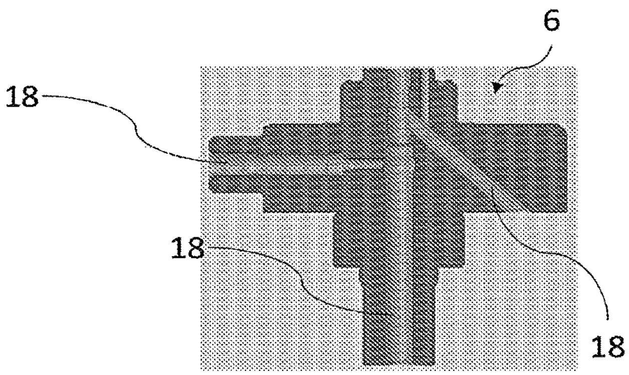
FIG. 8B shows a cross-sectional view of the pump tappet barrel of FIG. 8A.
Figure 9A:
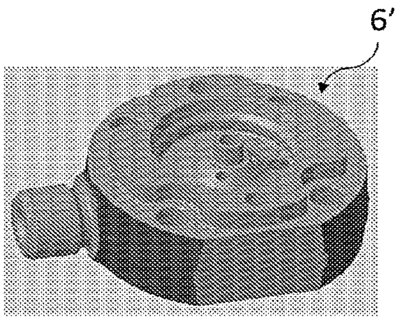
FIG. 9A shows a perspective view of a second embodiment of a pump tappet barrel of the fuel pump of FIG. 1.
Figure 9B:
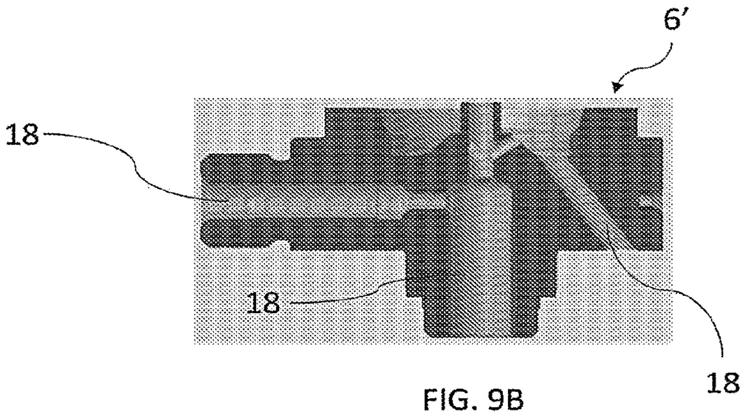
FIG. 9B shows a cross-sectional view of the pump tappet barrel of FIG. 9A.

With reference to FIGS. 3-7, fuel injector 4 includes an injector body 8 which houses an injector control valve seat 10 (FIG. 4), an injector needle seal 12 (FIG. 5), an injector needle 14 (FIG. 7), and an injector nozzle 16 (FIG. 6). The structural and functional details of fuel injector 2 may be similar to those disclosed in U.S. Pat. Nos. 5,676,114 and 7,156,368, the complete disclosures of which are expressly incorporated by reference herein.

Referring to FIGS. 2 and 8A-9B, fuel pump 4 includes at least one pump tappet barrel or pump compression cylinder 6, 6', illustratively two pump tappet barrels. Pump tappet barrel 6, 6' includes a plurality of channels 18 through which fuel may flow when fuel is passed through the fuel system.

Each of pump tappet barrel 6, injector control valve seat 10, injector needle seal 12, injector needle 14, and injector nozzle 16 are fuel system components that are configured to contact fuel when fuel is passed through the fuel system. To reduce corrosion, exemplary pump tappet barrel 6, injector control valve seat 10, injector needle seal 12, injector needle 14, and/or injector nozzle 16 of the present disclosure are fabricated from an annealed steel alloy bar comprising 0.01-0.31 wt. % carbon, 0.0-0.20 wt. % silicon, 0.15-0.50 wt. % manganese, 0.0-0.015 wt. % phosphorous, 0.0-0.001 wt. % sulfur, 4.80-5.20 wt. % chromium, 4.80-6.20 wt. % nickel, 0.60-0.80 wt. % molybdenum, 0.0-0.550 wt. % vanadium, and 2.000-2.400 wt. % aluminum, and having a hardness of 240-350 HV (Vickers Pyramid Number) and a density of approximately 7500-7600 $kg/m^3$, and more particularly, approximately 7582 $kg/m^3$. More particularly, in a first embodiment, exemplary pump tappet barrel 6, injector control valve seat 10, injector needle seal 12, injector needle 14, and/or injector nozzle 16 are fabricated from an annealed steel alloy bar, blank, or rough forged mass comprising 0.01-0.12 wt. % carbon, 0.0-0.20 wt. % silicon, 0.15-0.50 wt. % manganese, 0.0-0.015 wt. % phosphorous, 0.0-0.001 wt. % sulfur, 4.80-5.20 wt. % chromium, 4.80-5.20 wt. % nickel, 0.60-0.80 wt. % molybdenum, 0.0-0.100 wt. % vanadium, and 2.000-2.400 wt. % aluminum, while in a second embodiment, exemplary pump tappet barrel 6, injector control valve seat 10, injector needle seal 12, injector needle 14, and/or injector nozzle 16 are fabricated from an annealed steel alloy bar comprising 0.16-0.20 wt. % carbon, 0.0-0.20 wt. % silicon, 0.20-0.50 wt. % manganese, 0.0-0.015 wt. % phosphorous, 0.0-0.001 wt. % sulfur, 4.80-5.20 wt. % chromium, 5.80-6.20 wt. % nickel, 0.60-0.80 wt. % molybdenum, 0.450-0.550 wt. % vanadium, and 2.000-2.400 wt. % aluminum. In a third embodiment, exemplary pump tappet barrel 6, injector control valve seat 10, injector needle seal 12, injector needle 14, and/or injector nozzle 16 are fabricated from an annealed steel alloy bar comprising 0.25-0.31 wt. % carbon, 0.0-0.20 wt. % silicon, 0.20-0.50 wt. % manganese, 0.0-0.015 wt. % phosphorous, 0.0-0.001 wt. % sulfur, 4.80-5.20 wt. % chromium, 5.80-6.20 wt. % nickel, 0.60-0.80 wt. % molybdenum, 0.450-0.550 wt. % vanadium, and 2.000-2.400 wt. % aluminum.

Figure 10:
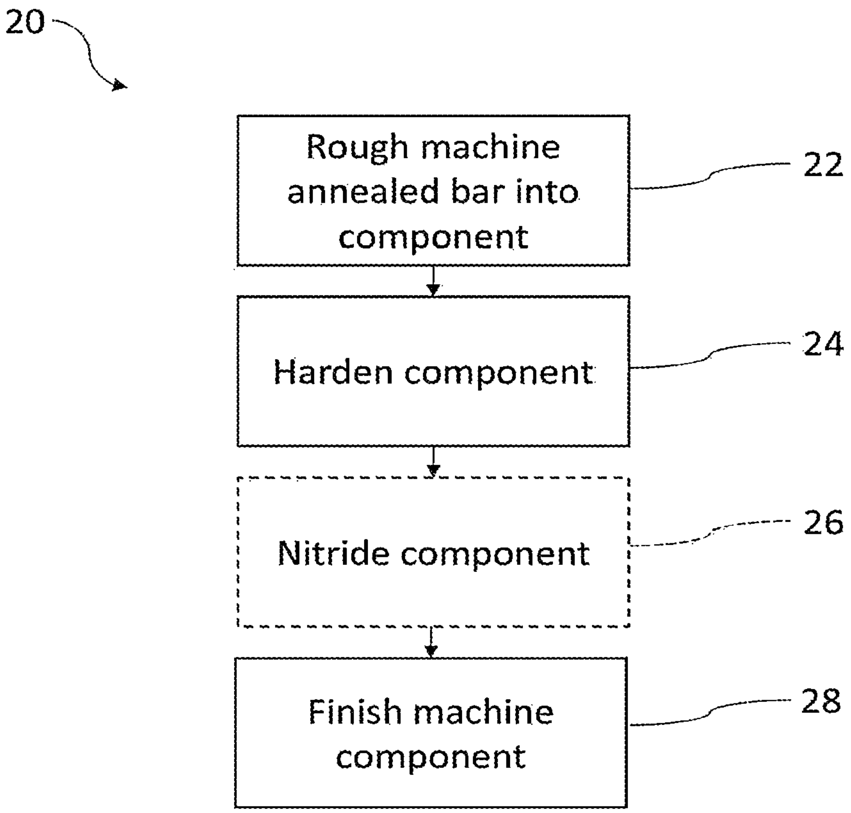
FIG. 10 shows a method of forming a fuel system component of the present disclosure.
Figure 11A:
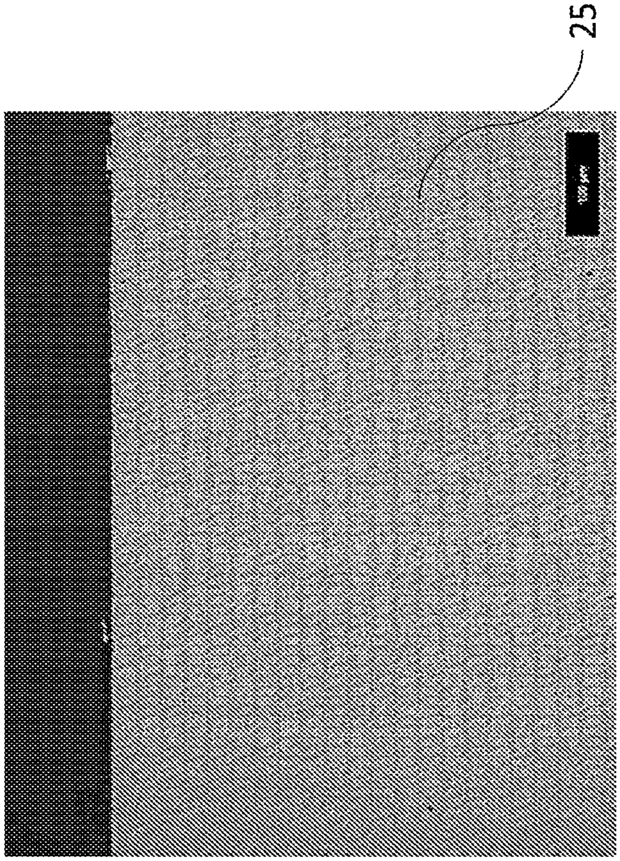
FIG. 11A shows a detailed cross-section view of a fuel system component of the present disclosure after core hardening.
Figure 11B:
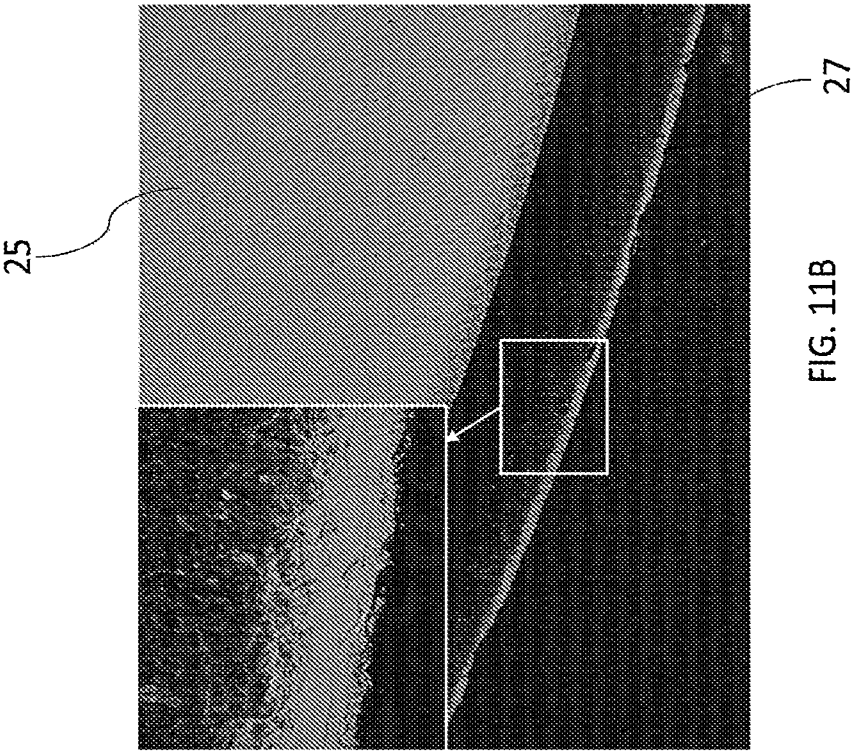
FIG. 11B shows a detailed cross-section view of the fuel system component of FIG. 10A after gas nitriding.

With reference to FIGS. 10-11B, a method 20 for forming the exemplary fuel components is provided. To begin the formation of the exemplary pump tappet barrel 6, injector control valve seat 10, injector needle seal 12, injector needle 14, and/or injector nozzle 16, the annealed steel alloy bar, blank, or rough forged mass is rough machined into the shape and form of the specific fuel component in a first step 22. The fuel component is then hardened in second step 24. To harden the fuel component, the fuel component is quenched, tempered, and/or age hardened to harden a core 25 of the fuel component (see FIG. 11A for a microstructure of the fuel component after core hardening). The hardness range of the fuel component after the core is hardened is approximately 50-62 HRC (Rockwell C) or approximately 505-790 HV. In various embodiments, the fuel component may be further hardened by subsequently gas nitriding the fuel component, as shown in step 26. The gas nitriding of the fuel component results in a compound layer 27 comprising iron nitrides being formed on the surface of the fuel component (see FIG. 11B). The hardness range of the fuel component after gas nitriding is approximately 900-1100 HK500gf (Knoop Hardness) or approximately 905-1340 HV. Once hardened, the fuel component can then be finish machined. Finish machining may include creating spray holes among other machining via grinding, electrical discharge machining (EDM), abrasive flow machining (AFM), laser drilling, and/or marking.

Figure 12:
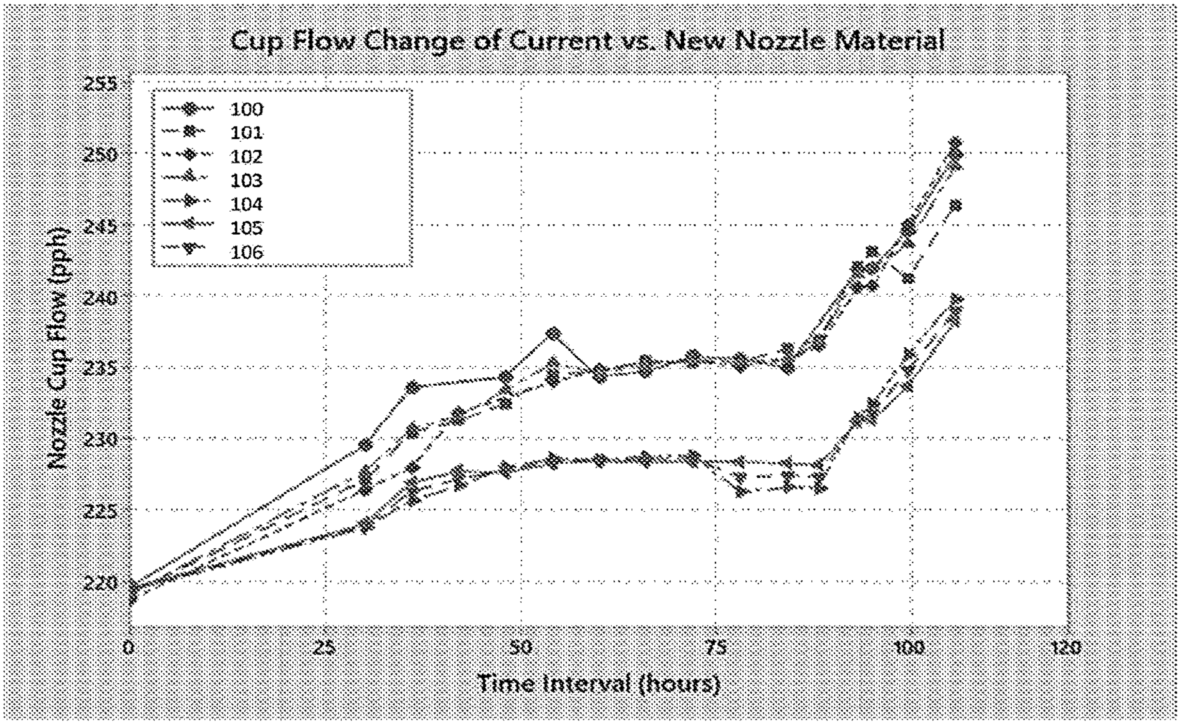
FIG. 12 shows a graph detailing nozzle cup flow versus time of a prior art nozzle as compared to that of a nozzle of the present disclosure.

Referring to FIG. 12, a graph of the nozzle cup flow in pounds per hour (pph) versus time in hours of a currently used or currently produced nozzle as compared to that of a nozzle of the present disclosure is provided. The currently used nozzle has a composition of 0.35-0.45 wt. % carbon, 0.80-1.20 wt. % silicon, 0.2-0.5 wt. % manganese, 0.0-0.030 wt. % phosphorous, 0.005-0.017 wt. % sulfur, 4.75-5.50 wt. % chromium, 0.00-0.35 wt. % nickel, 1.1-1.75 wt. % molybdenum, 0.8-1.2 wt. % vanadium, and 0.0-0.8 wt. % aluminum. The graph of FIG. 12 shows data for three runs 100, 101, and 102 of the currently used or currently produced nozzle, an average 103 of those three runs, two runs 104 and 105 of a nozzle of the present disclosure, and an average 106 of those two runs. As shown in the graph, the nozzle of the present disclosure had an increase of nozzle cup flow from approximately 220 pph to approximately 240 pph after approximately 110 hours or a change in nozzle cup flow of approximately 20 pph, while the currently used nozzle had an increase of nozzle cup flow from 220 pph to approximately 250 pph after approximately 110 hours or a change in nozzle cup flow of approximately 30 pph. Thus, the nozzle of the present disclosure has a better resistance to corrosion and thus a reduced increase in the cup flow as compared to the currently used or currently produced nozzle.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A fuel system, comprising:

at least one fuel component formed of a steel alloy comprising 0.01-0.31 wt. % carbon, 0.0-0.20 wt. % silicon, 0.15-0.50 wt. % manganese, 0.0-0.015 wt. % phosphorous, 0.0-0.001 wt. % sulfur, 4.80-5.20 wt. % chromium, 4.80-6.20 wt. % nickel, 0.60-0.80 wt. % molybdenum, 0.0-0.550 wt. % vanadium, and 2.000-2.400 wt. % aluminum, wherein the at least one fuel component is configured to come in contact with fuel when fuel is passed through the fuel system.

2. The fuel system of claim 1, wherein the at least one fuel component has a hardness of approximately 900-1100 HK500gf (Knoop Hardness).

3. The fuel system of claim 1, wherein the steel alloy comprises 0.01-0.12 wt. % carbon, 0.0-0.20 wt. % silicon, 0.15-0.50 wt. % manganese, 0.0-0.015 wt. % phosphorous, 0.0-0.001 wt. % sulfur, 4.80-5.20 wt. % chromium, 4.80-5.20 wt. % nickel, 0.60-0.80 wt. % molybdenum, 0.0-0.100 wt. % vanadium, and 2.000-2.400 wt. % aluminum.

4. The fuel system of claim 1, wherein the steel alloy comprises 0.16-0.20 wt. % carbon, 0.0-0.20 wt. % silicon, 0.20-0.50 wt. % manganese, 0.0-0.015 wt. % phosphorous, 0.0-0.001 wt. % sulfur, 4.80-5.20 wt. % chromium, 5.80-6.20 wt. % nickel, 0.60-0.80 wt. % molybdenum, 0.450-0.550 wt. % vanadium, and 2.000-2.400 wt. % aluminum.

5. The fuel system of claim 1, wherein the steel alloy comprises 0.25-0.31 wt. % carbon, 0.0-0.20 wt. % silicon, 0.20-0.50 wt. % manganese, 0.0-0.015 wt. % phosphorous, 0.0-0.001 wt. % sulfur, 4.80-5.20 wt. % chromium, 5.80-6.20 wt. % nickel, 0.60-0.80 wt. % molybdenum, 0.450-0.550 wt. % vanadium, and 2.000-2.400 wt. % aluminum.

6. The fuel system of claim 1, wherein the at least one fuel component has a surface layer comprised of a nitride compound layer.

7. The fuel system of claim 1, wherein the at least one fuel component includes at least one of an injector control valve seat, an injector needle seal, an injector needle, an injector nozzle and a pump tappet barrel.

8. A method of manufacturing a component of a fuel system, comprising:

rough machining an annealed steel alloy mass comprising 0.01-0.31 wt. % carbon, 0.0-0.20 wt. % silicon, 0.15-0.50 wt. % manganese, 0.0-0.015 wt. % phosphorous, 0.0-0.001 wt. % sulfur, 4.80-5.20 wt. % chromium, 4.80-6.20 wt. % nickel, 0.60-0.80 wt. % molybdenum, 0.0-0.550 wt. % vanadium, and 2.000-2.400 wt. % aluminum to form the component;

hardening a core of the component;

nitriding the component after hardening the core of the component; and finish machining the component.

9. The method of claim 8, wherein the step of finish machining the component includes at least one of grinding, electrical discharge machining, abrasive flow machining, laser drilling, and marking.

10. The method of claim 8, wherein the annealed steel alloy has a density of 7,500-7,600 $kg/m^3$.

11. The fuel system of claim 10, wherein the density is 7,582 $kg/m^3$.

12. The method of claim 8, wherein a hardness of the annealed steel alloy mass is approximately 240-350 HV.

13. The method of claim 8, wherein a hardness of the component after hardening the core is approximately 505-790 HV.

14. The method of claim 8, wherein a hardness of the component after nitriding the component is approximately 905-1340 HV.

15. The method of claim 8, wherein the step of hardening the core includes at least one of quenching, tempering, and age hardening of the component.

16. The method of claim 8, wherein the annealed steel alloy mass comprises 0.01-0.12 wt. % carbon, 0.0-0.20 wt. % silicon, 0.15-0.50 wt. % manganese, 0.0-0.015 wt. % phosphorous, 0.0-0.001 wt. % sulfur, 4.80-5.20 wt. % chromium, 4.80-5.20 wt. % nickel, 0.60-0.80 wt. % molybdenum, 0.0-0.100 wt. % vanadium, and 2.000-2.400 wt. % aluminum.

17. The method of claim 8, wherein the annealed steel alloy mass comprises 0.16-0.20 wt. % carbon, 0.0-0.20 wt. % silicon, 0.20-0.50 wt. % manganese, 0.0-0.015 wt. % phosphorous, 0.0-0.001 wt. % sulfur, 4.80-5.20 wt. % chromium, 5.80-6.20 wt. % nickel, 0.60-0.80 wt. % molybdenum, 0.450-0.550 wt. % vanadium, and 2.000-2.400 wt. % aluminum.

18. The method of claim 8, wherein the steel alloy comprises 0.25-0.31 wt. % carbon, 0.0-0.20 wt. % silicon, 0.20-0.50 wt. % manganese, 0.0-0.015 wt. % phosphorous, 0.0-0.001 wt. % sulfur, 4.80-5.20 wt. % chromium, 5.80-6.20 wt. % nickel, 0.60-0.80 wt. % molybdenum, 0.450-0.550 wt. % vanadium, and 2.000-2.400 wt. % aluminum.

* * * * *